3,002,020
SEPARATION OF ISOMERIC ALIPHATIC DICARBOXYLIC ACIDS OF TEN CARBON ATOMS
Funston G. Lum, Richmond, Calif., assignor to California Research Corporation, San Francisco, Calif., a corporation of Delaware
No Drawing. Filed Sept. 22, 1958, Ser. No. 762,241
4 Claims. (Cl. 260—537)

This invention relates to a process for isolating and separating in the form of their full salts straight-chain aliphatic dibasic acids from their branched-chain isomers and more particularly, to a novel method for removing pure sebacic acid from reaction mixtures containing sebacic acid, isomeric $C_{10}$ acids, such as 2,2'-diethyl adipic acid and 2-ethyl suberic acid, as well as certain $C_5$–$C_9$ monobasic acids.

U.S. Patent 2,749,364 discloses a method for the recovery of $C_{10}$ aliphatic dibasic acids from mixtures of salts of sebacic acid and other isomeric $C_{10}$ acids, together with small amounts of other acids, including monobasic carboxylic acids obtained by carbonation and hydrogenation of the dimetallo products formed by treating butadiene with finely dispersed sodium or potassium in a selected ether medium in the presence of a relatively small amount of polycyclic aromatic hydrocarbons and/or a solid attrition agent at a temperature preferably below 0° C. These $C_{10}$ dicarboxylic acids are obtained in the form of the full alkali metal salts, that is, salts in which both hydrogens of the acid groups have been replaced by an alkali metal cation, as distinguished from the half, or acid, salt referred to as such.

In the practice of the aforesaid patent when using sodium as the metal, a typical mixture comprises the $C_{10}$ dicarboxylic acids in the form of the sodium salts, sodium salts of various monobasic $C_5$ and $C_9$ acids, small traces of hydrogenation catalysts, condensed polymeric acids, and about 15% sodium chloride. Further, in accordance with the teaching of that patent, benzene is added to the mixture in an amount about equal to 20% of the total volume of the aqueous reaction mixture, followed by addition of concentrated hydrochloric acid in amounts varying between 5 and 10% by volume of the aqueous mixture to the mixture so as to form the monosodium salts of sebacic acid and the isomeric $C_{10}$ acid product. The solution is then saturated with sodium chloride, whereupon there are formed a solid phase of monosodium sebacate and a liquid phase, having the monosodium isomeric $C_{10}$ acids and the other impurities concentrated, respectively, in the aqueous and benzene layers thereof. A mixture of the isomeric $C_{10}$ acids is later separated from the aqueous layer of the liquid phase, the composition of the mixture, known as "Isosebacic" acid, being approximately:

| | Percent |
|---|---|
| Sebacic acid | 6–10 |
| 2,2'-diethyl adipic acid | 12–18 |
| 2-ethyl suberic acid | 72–80 |

The method of separation described in the aforesaid patent suffers from certain disadvantages which this invention is designed to remedy. The first disadvantage is the necessity of converting the alkali metal salts of sebacic acid and the isomeric $C_{10}$ acids to the monoalkali metal salts, which requires initial accurate determination of the free alkali and total organic acid content and then controlled addition of mineral acid to convert full salts to the half salts. A second, and more important, disadvantage in the prior art method is the fact that the separations are incomplete. Although substantially pure sebacic acid can be obtained, a considerable amount of the sebacic acid originally present in the reaction mixture is not recovered but is found in the "Isosebacic" acid. Sebacic acid is commercially more valuable than the "Isosebacic" acid, and as a result, as complete a recovery of sebacic acid as possible is strongly desired. Furthermore, in the event it is desired to separate the 2,2'-diethyl adipic acid from the 2-ethyl suberic acid, which are both contained in the "Isosebacic" acid mixture, it is advantageous to effect such separation in the absence of sebacic acid contaminant, which, being present, makes the separation of the other fractions more difficult.

Accordingly, an object of the present invention is to provide a process for effecting separations such that one portion contains substantially pure sebacic acid and the other portion contains a mixture of various isomeric $C_{10}$ acids substantially free from the presence of sebacic acid.

It has been discovered that the alkali metal salts of sebacic acid have low solubility in saturated or highly concentrated solutions of highly soluble inorganic salts of the same alkali metal. This is surprising, inasmuch as the alkali metal salts of the branched-chain isomers of sebacic acid, more specifically, 2,2'-diethyl adipic acid and 2-ethyl suberic acid, are quite soluble in solutions of such salts.

Based on the foregoing discovery of the low solubility of the alkali metal salts of sebacic acid in highly concentrated or saturated solutions of highly soluble inorganic salts of the same alkali metal, a process for the separation of the alkali metal salts of sebacic acid from mixtures containing the alkali metal salts of sebacic acid and the alkali metal salts of isomeric $C_{10}$ acids has been developed which comprises forming an intimate mixture of the salts with a highly concentrated solution of an inorganic salt of the same alkali metal so as to form a liquid phase and a solid phase, and separating the phases. The method is peculiar to the separation of sebacic acid from its isomers. For example, it has been attempted experimentally to separate 2,2'-diethyl adipic acid from 2-ethyl suberic acid by means of the methods employed in this invention. Such a separation has proved to be totally ineffective.

As stated above, the inorganic alkali metal salt used must have a high solubility in water, and its saturated or nearly saturated solution must be a poor solvent for the same alkali metal sebacate. How satisfactory a salt is can be determined experimentally. Certain alkali metal carbonates, halides, nitrates, and sulfates are preferred because of their extremely high solubility in water and their economy of use.

My process may better be described by means of the descriptions of the following methods of applying it. The method of forming the separable mixture is not critical. One method that may be used to form a separable mixture is to dissolve in water a mixture of the alkali metal salts of sebacic acid and the isomeric $C_{10}$ acids so as to form a homogeneous solution. An inorganic salt of the same alkali metal is then added until the solution is saturated with respect to the inorganic salt. At this time the alkali metal sebacate present is precipitated. The precipitate is then separated from the mother liquor by conventional means and then is washed several times either with small portions of a saturated solution of the same salt or alcohol-water mixtures having low solvency for the separated alkali metal sebacate. All the washes are combined with the initial filtrate, and the isomeric $C_{10}$ acids may be recovered from it by conventional means. The precipitate is then dissolved in water and the acid precipitated with a mineral acid. It is then washed free of the mineral acid with water and dried.

Another possibly more convenient manner in which to make the separation is to add the salts with stirring to a saturated solution of an inorganic salt of an alkali metal.

If the acids themselves rather than the alkali metal salts are available, they are neutralized by a volume of alkali metal base such as sodium or potassium hydroxide sufficient to form first the alkali metal salts. The separation process is then carried out on the salts as described above. The undissolved alkali metal sebacate then may be recovered as described earlier.

As already stated, the amount of concentrated aqueous solution of inorganic alkali metal salt employed in separating the alkali metal sebacate and the same alkali metal salts of isomeric $C_{10}$ acids from mixtures thereof may be any amount insufficient to dissolve all of the salts when the mixture has been brought into equilibrium, as by intimate mixing of the solid and liquid phases. The amount of aqueous salt solution of any particular inorganic alkali metal salt of any given concentration which is just sufficient to entirely dissolve the alkali metal isomeric $C_{10}$ acid salt may be simply determined. Measured amounts of the isomeric $C_{10}$ acid salts are added to the aqueous inorganic alkali metal salt solution at the desired temperature of operation until the solution has become saturated with respect to the inorganic alkali metal salt and begins to form a solid phase of alkali metal sebacate. From such measurements the amount of concentrated aqueous salt solution required to precipitate the alkali metal sebacate may be readily calculated.

Temperature conditions are not critical, providing that the inorganic alkali metal salt in the concentration of the inorganic alkali metal salt solution is first calcaulated with respect to the temperature to be employed. The reaction proceeds quite nicely at room temperature, although any convenient temperature range may be employed.

My invention may better be illustrated by means of the following examples which, however, are not meant to limit it.

*Example 1*

A mixture having the following composition by weight was prepared:

| | |
|---|---|
| Sodium sebacate | 9 |
| Sodium 2-ethyl suberate and 2,2'-diethyl adipate | 21 |
| Water | 70 |

20 parts by weight of sodium chloride were added to the mixture. The separated sodium sebacate was removed by filtration, and the filter cake was washed with saturated sodium chloride. The filtrate and washes were set aside for later recovery of the isomeric $C_{10}$ acids. The separated sodium sebacate was dissolved in water, and the sebacic acid liberated upon the addition of hydrochloric acid. The sebacic acid was filtered and washed with water. The amount of sebacic acid recovered amounted to about 93% of the sebacic acid present in the original mixture.

*Example 2*

A solution having the following composition by weight was prepared:

| | |
|---|---|
| Potassium sebacate | 14 |
| Potassium 2-ethyl suberate and 2,2'-diethyl adipate | 21 |
| Water | 65 |

65 parts by weight of potassium carbonate were added to the mixture. A precipitate appeared. This precipitate of potassium sebacate was removed by filtration and washed with a saturated solution of potassium carbonate. The separated potassium sebacate was converted to the acid as described in Example 1. Approximately 93% of the sebacic acid present in the original mixture was recovered.

*Example 3*

A mixture having the following composition by weight was prepared:

| | |
|---|---|
| Sodium Isosebacate | 30 |
| Water | 70 |

18 parts by weight of sodium chloride were added to the mixture. The separated sodium sebacate was removed by filtration, and the filter cake was washed with a 5:1 by volume isopropanol-water mixture. The separated sodium sebacate was converted to the acid as described in Example 1. The amount of sebacic acid recovered amounted to approximately 80% of the sebacic acid present in the original Isosebacic acid.

*Example 4*

A solution having the following composition by weight was prepared:

| | |
|---|---|
| Potassium Isosebacate | 35 |
| Water | 65 |

60 parts by weight of potassium carbonate were added to the mixture. A precipitate of potassium sebacate formed. It was removed by filtration, and the filter cake was washed with a 10:1 by volume isopropanol-water mixture. The separated potassium sebacate was converted to the acid as described in Example 1. The amount of sebacic acid recovered amounted to approximately 90% of the sebacic acid present in the original Isosebacic acid.

In Examples 3 and 4, commercial Isosebacic acid was purposely used to show how the sebacic acid remaining in the isomeric $C_{10}$ acids can be removed by the process of this invention.

I claim:

1. Process for separating a full alkali metal salt of sebacic acid from a full alkali metal salt of "Isosebacic acid," which comprises saturating an aqueous solution of a full alkali metal salt of "Isosebacic acid" with a water-soluble inorganic salt of the same alkali metal as in the salt of the "Isosebacic acid," to form a liquid phase and a solid phase of the full alkali metal salt of sebacic acid, and separating the phases.

2. Process of claim 1 according to which sebacic acid is regenerated from the solid phase.

3. Process according to claim 1 wherein the inorganic alkali metal salt is selected from the group consisting of halides, carbonates, sulfates, and nitrates.

4. Process according to claim 3, wherein the alkali metal is sodium.

References Cited in the file of this patent

UNITED STATES PATENTS 2,839,571     Johnston et al.        June 17, 1958

OTHER REFERENCES

Noller: Chemistry of Organic Compounds, second edition, page 794.